United States Patent [19]

Keegan et al.

[11] Patent Number: 4,866,938
[45] Date of Patent: Sep. 19, 1989

[54] MASTER CYLINDER PISTON WITH FLOATING SEALING RING RECUPERATION VALVE

[75] Inventors: Colm M. P. Keegan; Michael J. Hawker; Peter J. Goodwin, all of Lincoln, England

[73] Assignee: Clayton Dewandre Co. Ltd., Lincoln, England

[21] Appl. No.: 147,055

[22] Filed: Jan. 22, 1988

Related U.S. Application Data

[63] Continuation of Ser. No. 795,066, Nov. 5, 1985, abandoned.

[30] Foreign Application Priority Data

Nov. 5, 1984 [GB] United Kingdom ............... 8427913

[51] Int. Cl.⁴ ........................ B60T 11/28; F15B 7/08
[52] U.S. Cl. ........................ 60/588; 60/585; 60/589; 92/241
[58] Field of Search .............. 60/585, 588, 589; 417/511; 251/319, 324; 92/241, 254; 277/188 R, 188 A

[56] References Cited

U.S. PATENT DOCUMENTS

| | | | |
|---|---|---|---|
| 2,377,017 | 5/1945 | Lacoe | 60/588 |
| 2,396,155 | 3/1946 | Christensen | 60/588 |
| 2,512,098 | 6/1950 | Gratzmuller | 92/254 X |
| 2,659,566 | 11/1953 | Rand | 251/324 X |
| 2,992,870 | 7/1961 | Carlson et al. | 92/254 X |
| 3,009,721 | 11/1961 | Newton | 277/188 A X |
| 3,141,303 | 7/1964 | Baldwin | 60/588 |
| 3,319,537 | 5/1967 | Pittman | 92/241 X |
| 3,980,004 | 9/1976 | Jones et al. | 92/182 |
| 4,027,816 | 6/1977 | Slator et al. | 277/188 R |
| 4,099,380 | 7/1978 | Cadeddu | 60/588 |
| 4,219,204 | 8/1980 | Pippert | 277/188 A |
| 4,602,791 | 6/1986 | Zollner | 277/188 A X |
| 4,630,833 | 12/1986 | Boyle et al. | 277/188 A |

FOREIGN PATENT DOCUMENTS

| | | | |
|---|---|---|---|
| 1301715 | 8/1969 | Fed. Rep. of Germany | 60/585 |
| 1655300 | 4/1971 | Fed. Rep. of Germany | . |
| 1019450 | 1/1953 | France | 417/511 |
| 1316544 | 12/1962 | France | . |
| 572095 | 9/1945 | United Kingdom | 417/511 |
| 1002251 | 8/1965 | United Kingdom | . |
| 1333050 | 12/1969 | United Kingdom | . |
| 1468014 | 3/1977 | United Kingdom | . |

Primary Examiner—Robert E. Garrett
Assistant Examiner—George Kapsalas
Attorney, Agent, or Firm—G. P. Baier

[57] ABSTRACT

A hydraulic master cylinder piston carries a circumferential seal ring which allows recuperation flow valving. The floating seal has a reinforcing metal girdle which prevents radial expansion and axial crushing. The seal material resists extrusion and has an outer radius slightly greater than the radius of the circumferential girdle. A forward slotted bearing ring maintains the piston in alignment with the bore. During piston return, recuperation occurs through a path comprising the radial clearance between piston and floating seal ring and at least one slot or groove in the bearing ring. Upon full piston return, the seal is withdrawn from the master cylinder working chamber into a larger diameter bore communicating with the reservoir and thus allows relatively free make-up flow.

25 Claims, 2 Drawing Sheets

MASTER CYLINDER PISTON WITH FLOATING SEALING RING RECUPERATION VALVE

This is a continuation of co-pending application Ser. No. 795,066, filed Nov. 5, 1985 now abandoned.

BACKGROUND OF THE INVENTION

This invention relates to a master cylinder for hydraulic systems, for example, braking systems and, more particularly, to the provision of recuperation in such systems. British Patent Specification No. 1,333,050 relates to a hydraulic booster comprising a pedal actuated master cylinder, a power valve and a boost cylinder, and a later Patent Specification, No. 1,468,014, describes a version of the booster adapted to anti-lock operation by the addition of solenoid valves and another boost cylinder.

In such systems, recuperation is required in the pedal released condition to allow the braking (or clutch) system to self-bleed, i.e., any air bubbles that may be present in the fluid are allowed to travel upward to the reservoir. Recuperation may also be necessary to prevent a vacuum being induced in the braking circuit by the master cylinder on its return stroke in the event of a slight fluid loss from the brake circuit or when bleeding the brake circuit.

Recuperation may also be required in the event of expansion of the fluid in the system to ensure full release of pressure in the pedal released condition. It has been found that anti-lock operation introduces new conditions of operation that can result in problems using conventional recuperation means. Various methods of recuperation are known:

1. The use of seals passing over holes or slots. With this type of recuperation in anti-lock use, it is possible to have the seal cycling rapidly across the hole, resulting in premature wear and leakage of the seal.

2. Center valves may be used in a horizontally disposed cylinder. However, the possibility of air being trapped above the level of the valve can lead to incomplete self-bleeding. This may not be a problem in normal operation, but can aversely affect anti-lock operation.

3. A tilt valve may be used to overcome the difficulties referred to above, but due to its method of operation and the bulk thereof, it is not always a convenient device to use, in particular with the additional complication of an anti-lock unit.

Another proposal enabling recuperation is to arrange the piston such t hat it can be withdrawn from the cylinder bore to the extent of providing a recuperation flowpath past a seal between the piston and the bore. A serious deficiency of such an arrangement, however, is that the seal, usually a rubber seal mounted on the piston, tends to be extruded into the gap which remains between the piston and an enlarged portion of the bore when pressure has built up after re-entry of the seal lip into the bore at the beginning of the forward stroke.

SUMMARY OF THE INVENTION

One object of the present invention is to facilitate recuperation particularly in hydraulic master cylinders whether for brake or clutch operating systems and to avoid the problems inherent in previously proposed methods of recuperation, especially the extrusion of the seal.

In accordance with the present invention, we propose a master cylinder comprising a cylinder housing defining a bore, one end of which opens into a chamber communicating with a reservoir for hydraulic fluid, a piston slidably received in the bore to perform forward and return strokes and means providing a seal between the piston and the bore, the arrangement being such that the piston can be withdrawn from the bore at least to the extent of providing past the seal, a recuperation flowpath communicating between the cylinder bore and the reservoir via the chamber, wherein the sealing means comprises a ring of sealing material and a reinforcing girdle of rigid material. Usually the seal is carried on the piston and is withdrawn from the cylinder with the piston to establish the recuperation flowpath.

In one embodiment of this invention, we propose using on the piston a floating seal (i.e., a seal having a controlled amount of radial and axial movement with respect to the piston) in the form of a ring of PTFE or other sealing material having a stiffness sufficient to resist extrusion on entering the bore. Further, the sealing ring may have a reinforcing girdle of high tensile strength and stiffness, for example, of steel, to prevent radial expansion of the seal and to prevent axial crushing of the seal against its back sealing face, the seal material preferably protruding slightly beyond the girdle to permit sealing on that face. So that the piston can be withdrawn from the bore while retaining accurate alignment with it, alignment means are provided and, in a preferred embodiment, this is achieved by a bearing ring disposed between the seal and the leading end of the piston. Preferably, the seal is confined with limited axial clearance between the bearing ring on the one hand and a shoulder of the piston on the other.

With the floating seal disposed between the piston shoulder and the bearing ring, which maintains the piston in alignment with the bore, the seal can align itself with and seal on the cylinder bore and can seal also against the supporting shoulder of the piston to generate hydraulic pressure in the cylinder during the upstroke.

During the piston return stroke, a negative pressure may be generated and to allow recuperation in this mode, the bearing ring has therethrough at least one flowpath communicating with the radial clearance between the piston and the floating seal. A recuperation flowpath is therefore available through the bearing ring, the annular gap between the piston and the seal and the axial gap between the shoulder of the piston and rear face of the piston seal produced as the piston reverses direction, into a space communicating with the fluid reservoir.

Preferably, the bearing ring has axial slots across its outer circumference arranged to ensure that one slot will always be near the top of the cylinder to act as a recuperation passage and to ensure that all air bubbles can escape to the reservoir when the seal is withdrawn out of contact with the bore.

For the purposes of guiding the seal into the bore, the seal may have a lead-in portion, for example, a chamfer or a chamfered extension, the end of which is of a smaller diameter than the bore. The bore may also have a lead-in chamfer.

BRIEF DESCRIPTION OF THE DRAWINGS

Embodiments of the present invention will now be described by way of example, with reference to the accompanying drawings, in which.

DETAILED DESCRIPTION OF THE PREFERRED EMBODIMENTS

Figure 1:
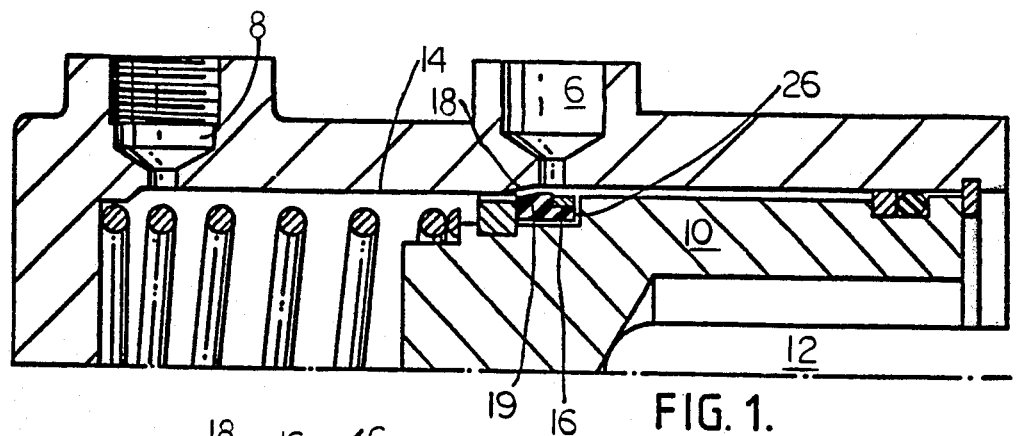
FIG. 1 is a part cross-sectional view of a typical master cylinder according to the present invention.

FIG. 1 shows a typical master cylinder having a piston 10 working in a cylinder bore 14, a delivery port 8 for connection to a braking system, and an inlet port 6 in communication with a reservoir for hydraulic fluid.

Figure 2:
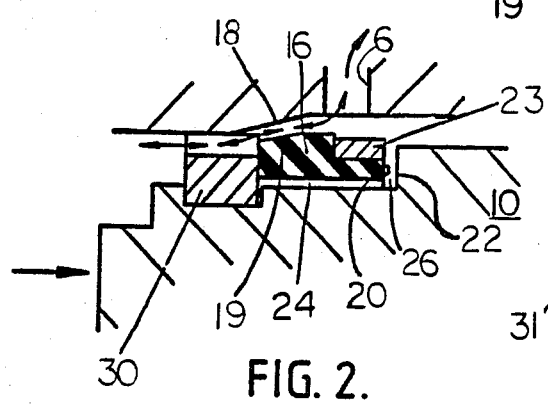
FIG. 2 is a view to an enlarged scale, showing the construction of the seal and its relationship to the bearing ring and cylinder bore.

When the brake pedal of a vehicle is depressed, the master cylinder piston 10 is moved by rod 12 into the master cylinder bore 14 and the floating seal 16 which has a free diameter slightly greater than the bore 14 after a predetermined free travel contacts the bore being guided by a lead-in chamfer 18 on the bore and a lead-in chamfer 19 on the seal as shown in FIGS. 1 and 2. The seal 16 seals against the bore and also, by its back face 20, against a shoulder 22 on the piston, the friction on the seal being sufficient to make the seal contact the shoulder. As the piston continues to enter the bore, the pressure in the cylinder bore 14 begins to rise, at a rate depending on the compliance of the system to which it is attached, and this pressure acts on the seal 16 tending to push it through the axial cap which still exists between the start of the bore and the shoulder 22 of the piston.

To prevent the seal from being pushed through the gap, it is first of all made of a relatively stiff sealing material such as PTFE, and secondly is reinforced by a band or girdle 23 of rigid material such as steel, or possibly of a fibre and/or plastics material, of high tensile strength and stiffness. The girdle 23 supports the seal 16 radially to prevent extrusion through the gap and also axially to prevent it being crushed against the piston shoulder 22 at high pressures, but allowing it to seal against the shoulder.

The piston is maintained in accurate alignment with the cylinder bore even when the seal is withdrawn from the bore, by a bearing ring 30, the seal 16 being disposed between the bearing ring 30 and the shoulder 22 with a limited axial clearance 26 typically of the order of 0.1 to 0.5 mm.

Figure 3:
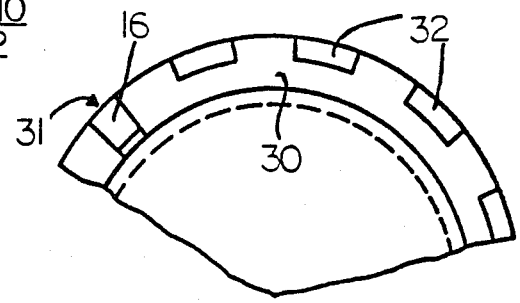
FIG. 3 is end view on arrow A in FIG. 2 of the bearing ring showing a flowpath affording recuperation during the piston return stroke.
Figure 6:
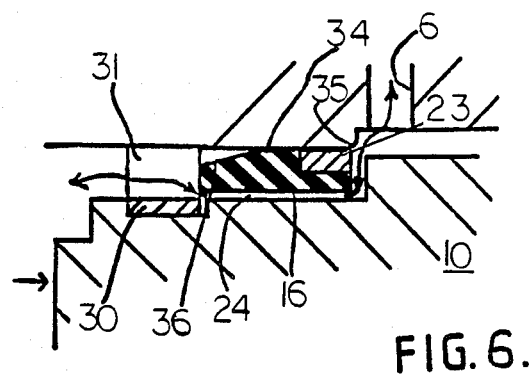
FIG. 6 is a cross-sectional view of an alternative embodiment which shows the flowpath in the radial gap established during a return stroke.

To allow recuperation in the event of a negative pressure established during the return stroke of the piston, there is a radial gap 24 between the inside of the seal 16 and the piston 10 and an axial clearance 26 created by movement of the seal 16 due to the negative pressure, away from the shoulder 22 when the piston reverses direction. The bearing ring 30 is not a complete ring but, as shown in FIG. 3, has a gap 31 of typically one or two millimeters in communication with the radial (24) and axial (26) gaps between the seal and the piston to allow recuperation when the seal 16 is in the bore (see FIG. 6). The bearing ring 30 always remains in the bore and preserves alignment of the piston with the bore, the radial free play of the floating seal enabling it to center itself in the bore. The bearing ring 30 furthermore has a number of axial slots 32 around its outer circumference such that one slot is always near the top of the bore to ensure the free passage of air bubbles to the space in communication with the reservoir.

Figure 4:
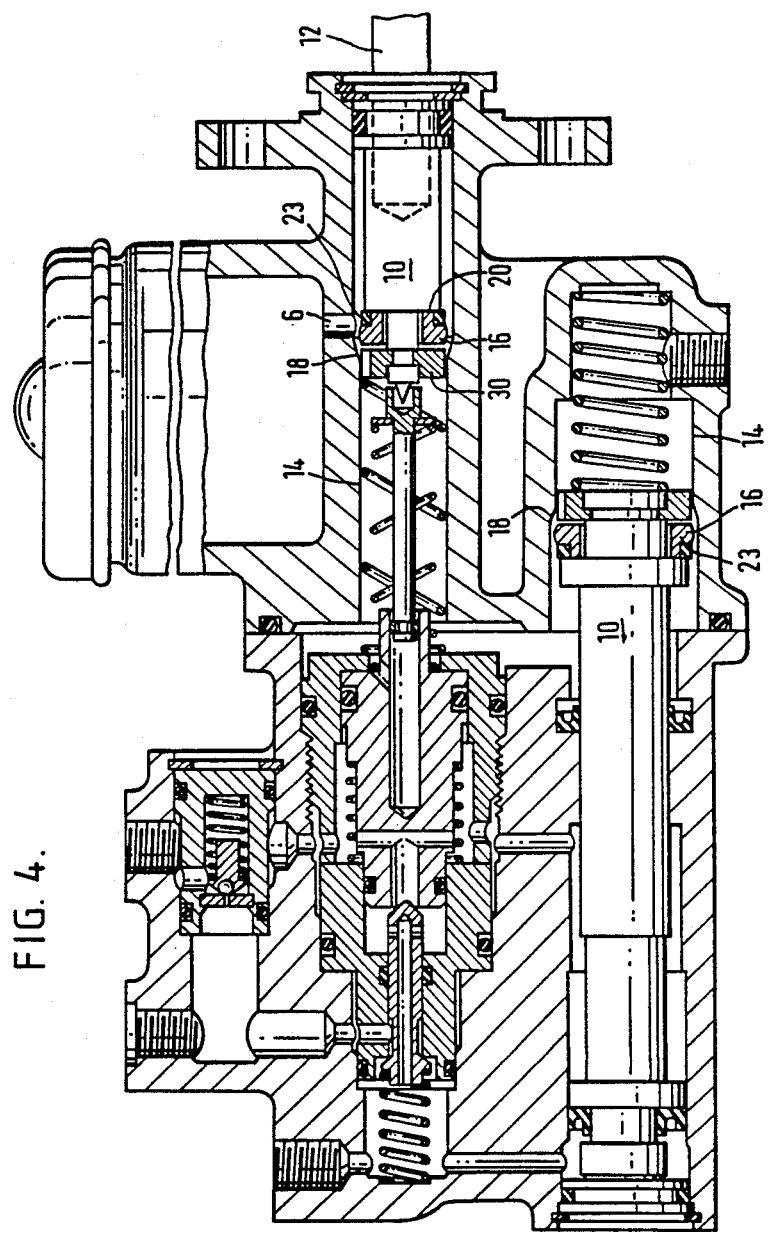
FIG. 4 is a sectional view of a booster and master cylinder unit for a boosted hydraulic braking system.

FIG. 4 is a sectional view of a booster and master cylinder unit similar to the unit described in British Patent Specification No. 1,333,050. The construction and operation of the unit is fully described in the above-mentioned specification to which reference is directed, except that the master cylinders are modified in accordance with the present invention, to provide recuperation both during and at the end of the return stroke, thus obviating the need for the tilt valve and the center valve previously used for this purpose. The arrangement is substantially the same as described above with reference to FIG. 1 and, in FIG. 4, the same reference numerals are used to indicate the same or equivalent features.

Figure 5:
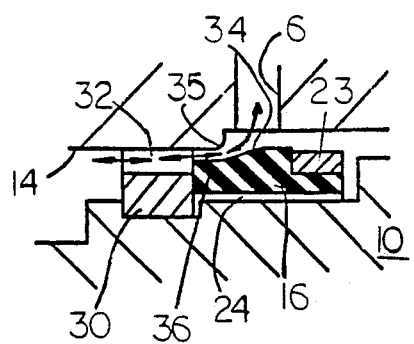
FIG. 5 is a cross-section of an alternative construction of the seal.

Another embodiment of seal shown in FIG. 5 has a lead-in chamfer 34 between a reduced diameter portion 36 at the leading end of the seal 16 which in this embodiment is never fully withdrawn from the cylinder bore 14, and the outer diameter of the seal. In other respects, this seal is similar to the seal shown in FIGS. 1 and 2.

The lead-in chamfer to the cylinder bore can then be replaced by a radiused corner to afford better control of the free travel in the cylinder.

We claim:

1. A master cylinder comprising a cylinder housing, a chamber in the housing having an inlet for connection or connected to a source of hydraulic fluid, a cylinder bore, one end of which opens into the said chamber, a piston slidably received in said bore, a sealing ring providing a seal between said piston and said bore, and means arranged to maintain alignment of said piston and said bore whereby at the end of the return stroke said piston can be withdrawn from said cylinder bore into the chamber at least to the extent of providing past and radially outward from said seal, a recuperation flow path between said cylinder bore and said source of hydraulic fluid, characterized in that said sealing ring is floating so as to be movable in the radial direction and comprises a ring of sealing material and a reinforcing girdle of rigid material.

2. A working cylinder comprising a cylinder housing having a bore, one end of said bore opening into a chamber communicating with a fluid reservoir, a piston slidably received in said bore to perform forward and return strokes, sealing means providing a seal between said piston and said bore, said piston positioned in said housing such that said piston can be withdrawn axially at least a portion from said bore to a return position providing fluid passage in the space between said bore and said seal means, thereby establishing a recuperation fluid flowpath communicating between said cylinder bore and said chamber, said sealing means having a ring of resilient sealing material and a reinforcing girdle of rigid material circumferentially surrounding a least portion of said ring, said ring having at least a portion of said ring, said ring having at least a portion with a noncompressed radius greater than the radius of said bore, said noncompressed radius portion being non-contracting with said bore when said portion is in said return position, said reinforcing girdle having an outermost radius less than the radius of said bore so as to be nonbearing on said bore, said ring positioned on said sealing means axially in the direction of said return stroke from said noncompressed portion so as to be axially withdrawn from said bore when said piston is in said return position, thereby containing the outward pressure exerted on said girdle without transferring the force from said outward pressure to said bore, wherein said sealing means comprises a floating sealing ring mounted on said piston and movable in at least the radial direction, thereby forming a radial gap between said piston and said sealing ring.

3. The working cylinder, according to claim 2, wherein said sealing ring has front and back faces with respect to the forward strokes of said piston, said piston has an adjacent face opposing said back face of said sealing ring, and said sealing ring having limited axial movement on said piston to provide a seal against said adjacent face on said piston during the forward stroke of said piston and to provide a fluid communication through axial spacing from said adjacent face on said piston during the return stroke thereby forming a fluid flowpath between said bore and the radial sealing ring clearance in said gap.

4. A working cylinder, according to claim 3, wherein said sealing ring protrudes axially beyond said reinforcing girdle at the back face of said sealing ring.

5. A working cylinder, according to claim 4, wherein said sealing rang has a tapered lead-in portion, the leading edge of said sealing ring having a diameter smaller than the diameter of said bore.

6. A working cylinder, according to claim 2, further comprising alignment means including a bearing ring on said piston, and said sealing ring has front and back faces with respect to the forward stroke of the piston, said sealing ring has limited axial movement on said piston between a shoulder on said piston against which said back face of said seal seats providing sealing on the forward stroke of said piston, and between the rear face on said bearing ring providing a flowpath during the return stroke through said bearing ring communicating between said bore and said chamber via axial spacing of said back face of said seal from said piston and said radial gap.

7. A working cylinder according to claim 6, wherein said bearing ring has at least one slot across its circumferential surface to provide fluid communication from one side of said bearing ring to the other side of said bearing ring.

8. A working cylinder, according to claim 7, wherein said bearing ring has a plurality of axially extending slots equally angularly spaced around the circumference of said bearing ring.

9. A working cylinder, according to claim 8, wherein at least one of said slots extends radially inward of the innermost radial portion of said sealing ring.

10. A working cylinder comprising a cylinder housing having a bore, one end of said bore opening into a chamber communication with a fluid reservoir, a piston slidably received in said bore to perform forward and return strokes, sealing means providing a seal between said piston and said bore, said piston positioned in said housing such that said piston can be withdrawn axially at least a portion from said bore to a return position providing fluid passage in the space between said bore and said seal means, thereby establishing a recuperation fluid flowpath communicating between said cylinder bore and said chamber, said sealing means having a ring of resilient sealing material and a reinforcing girdle of rigid material circumferentially surrounding at least a portion of said ring, said ring having at least a portion with a non-contracting compressed radius greater than the radius of said bore, said noncompressed radius portion being noncontacting with said bore when said portion is in said return position, said reinforcing girdle having an outermost radius less than the radius of said bore so as to be nonbearing on said bore, said ring positioned on said sealing means axially in the direction of said return stroke from said noncompressed portion so as to be axially withdrawn from said bore when said piston is in said return position, thereby containing the outward pressure exerted on said girdle without transferring the force from said outward pressure to said bore, further comprising alignment means on said piston to maintain alignment of said piston in said bore on the return stroke when said sealing means is withdrawn from said bore, said alignment means having an annular bearing ring disposed on said piston axially between said sealing means and the leading end of said piston, and said sealing means includes a sealing ring on said piston, wherein said sealing means comprises a floating sealing ring mounted on said piston and movable in at least the radial direction, thereby forming a radial gap between said piston and said sealing ring.

11. A working cylinder, according to claim 10, wherein said alignment means includes a bearing ring on said piston, and said sealing ring has front and back faces with respect to the forward stroke of the piston, said sealing ring has limited axial movement on said piston between a shoulder on said piston against which said back face of said seal seats providing sealing on the forward stroke of said piston, and between the rear face on said bearing ring providing a flowpath during the return stroke through said bearing ring communicating between said bore and said chamber via axial spacing of said back face of said seal from said piston and said radial gap.

12. The working cylinder, according to claim 10, wherein said sealing ring has front and back faces with respect to the forward strokes of said piston, said piston has an adjacent face opposing said back face of said sealing ring, and said sealing ring having limited axial movement on said piston to provide a seal against said adjacent face on said piston during the forward stroke of said piston and to provide a fluid communication through axial spacing from said adjacent face on said piston during the return stroke thereby forming a fluid flowpath between said bore and the radial sealing ring clearance in said gap.

13. A working cylinder, according to claim 12, wherein said sealing ring protrudes axially beyond said reinforcing girdle at the back face of said sealing ring.

14. A working cylinder according to claim 13, wherein said bearing ring has at least one slot across its circumferential surface to provide fluid communication from one side of said bearing ring to the other side of said bearing ring.

15. A working cylinder, according to claim 14, wherein said bearing ring has a plurality of axially extending slots equally angularly spaced around the circumference of said bearing ring.

16. A working cylinder, according to claim 15, wherein at least one of said slots extends radially inward of the innermost radial portion of said sealing ring.

17. A master cylinder comprising a cylinder housing defining a bore, one end of which opens into a chamber communicating with a reservoir for hydraulic fluid, a piston slidably received in said bore to perform forward and return strokes and a sealing ring providing a seal between said piston and said bore, wherein said piston can be withdrawn from said bore at least to the extent of providing past and radially outward from the seal, a recuperation flow path communicating between said cylinder bore and said reservoir via said chamber, characterized in that said sealing ring is floating so as to be movable in the radial direction and comprises a ring of sealing material and a reinforcing girdle of rigid material.

18. A master cylinder, according to claim 17, wherein said sealing ring has a front face and a back face with respect to the forward stroke of said piston; and is confined with limited axial clearance between a shoulder of said piston against which said back face of said seal seals during the forward stroke and said rear face of said bearing ring on said piston for maintaining said piston in alignment with said bore; and provides a flow path through said bearing ring communicating between said bore and the radial sealing ring clearance to provide recuperation via the axial gap between said back face of said seal and said shoulder on said piston during the return stroke.

19. A master cylinder, according to claim 17, wherein said sealing ring is piston-mounted and said piston carries a bearing ring disposed between said sealing ring and a leading end of said piston to maintain said piston in alignment with said bore when said seal is withdrawn therefrom at the end of the return stroke.

20. A master cylinder, according to claim 19, wherein said bearing ring has one or more slots across its circumferential surface to provide fluid communication from one side of said bearing ring to the other side of said bearing ring.

21. A master cylinder, according to claim 20, wherein said bearing ring has a plurality of axially extending slots equally angularly space around the circumference thereof.

22. A master cylinder, according to claim 17, wherein said sealing ring has a front face and a back face with respect to the forward stroke of said piston; and said sealing ring is confined with limited axial clearance between axially spaced faces on said piston such that said back face of said seal seals against said back face on said piston during the forward stroke, and provides a flow path communicating between said cylinder bore and the radial sealing ring clearance to provide recuperation via an axial gap between said back face of said seal and the corresponding sealing face on said piston during the return stroke.

23. A master cylinder, according to claim 22, wherein said sealing ring protrudes beyond said reinforcing girdle at said back face of said seal.

24. A master cylinder, according to claim 22, wherein said seal has a lead-in portion, the leading end of which has a smaller diameter than said bore.

25. A master cylinder, according to claim 24, further comprising a lead-in chamber portion between said chamber and said cylinder bore.

* * * * *

UNITED STATES PATENT AND TRADEMARK OFFICE
CERTIFICATE OF CORRECTION

PATENT NO. : 4,866,938
DATED : September 19, 1989
INVENTOR(S) : Colm M. P. Keegan, Michael J. Hawker, and Peter J. Goodwin It is certified that error appears in the above-identified patent and that said Letters Patent is hereby corrected as shown below:

Column 4, line 58, delete "a least" and insert --at least a-- lines 59-60, delete "of said ring, said ring having at least a portion"

lines 62-63, delete "non-contract-ing" and insert --non-contacting--

Column 5, line 25, delete "rang" and insert --ring-- line 68, delete "non-contracting compressed" and insert --non-compressed--

Column 8, line 6, delete "space" and insert --spaced--

Signed and Sealed this

First Day of January, 1991

Attest:

HARRY F. MANBECK, JR.

*Attesting Officer*      *Commissioner of Patents and Trademarks*

UNITED STATES PATENT AND TRADEMARK OFFICE
CERTIFICATE OF CORRECTION

PATENT NO. : 4,866,938

DATED : September 19, 1989

INVENTOR(S) : Colm M. P. Keegan, Michael J. Hawker, and Peter J. Goodwin

It is certified that error appears in the above-identified patent and that said Letters Patent is hereby corrected as shown below:

Column 5, lines 28-29, delete "further comprising alignment means including" and insert --wherein said alignment means includes--

Signed and Sealed this

Twenty-third Day of November, 1993

Attest:

BRUCE LEHMAN

Attesting Officer

Commissioner of Patents and Trademarks